US009214798B1

(12) United States Patent
Gawron, Sr. et al.

(10) Patent No.: US 9,214,798 B1
(45) Date of Patent: Dec. 15, 2015

(54) RANGE INFINITE SWITCH WITH INTEGRAL GFCI SUBSYSTEM

(71) Applicant: General Electric Company, Schenectady, NY (US)

(72) Inventors: Gregory Francis Gawron, Sr., Jeffersontown, KY (US); Robert John Zanelli, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/533,171

(22) Filed: Nov. 5, 2014

(51) Int. Cl.

| | |
|---|---|
| ***H05B 1/02*** | (2006.01) |
| ***H02H 3/16*** | (2006.01) |
| ***H02H 7/20*** | (2006.01) |
| ***F24C 7/08*** | (2006.01) |

(52) U.S. Cl.
CPC ................ *H02H 3/162* (2013.01); *F24C 7/088* (2013.01); *H02H 7/20* (2013.01); *H05B 1/0266* (2013.01)

(58) Field of Classification Search
CPC ........... H02H 3/162; H05H 7/20; H05B 1/02; H05B 1/0266; H05B 1/0263; H05B 1/0258; H05B 1/0202; F24C 7/088
USPC .................. 219/519, 507, 494, 412, 414, 497
See application file for complete search history.

(56) References Cited

U.S. PATENT DOCUMENTS

| | | | | |
|---|---|---|---|---|
| 3,699,307 A * | 10/1972 | Malkin | H05B 1/0225 219/412 |
| 4,370,692 A | 1/1983 | Wellman, Jr. et al. | |
| 7,208,704 B1 * | 4/2007 | Couts | H05B 1/0266 219/491 |
| 8,144,440 B2 | 3/2012 | Aoki | |
| 2004/0016747 A1 * | 1/2004 | Larson | H05B 1/0266 219/492 |
| 2011/0049127 A1 * | 3/2011 | Donarski | H05B 1/0266 219/448.17 |

* cited by examiner

*Primary Examiner* — Mark Paschall
(74) *Attorney, Agent, or Firm* — Dority & Manning, P.A.

(57) ABSTRACT

A range infinite switch including a ground fault circuit interrupter (GFCI) subsystem is provided. The GFCI subsystem operates a solenoid and plunger arrangement that activates a mechanical interlock within the switch permitting axial movement of a cam customarily used to bias temperature controlling contacts within the switch. Upon detection of a ground fault the latching mechanism is released and the cam moves to a position where the temperature controlling contacts are opened so as to disconnect power to a range heating element. In an appliance having more than one heating element, each heating element would be separately protected from ground fault conditions by use of the disclosed switch.

17 Claims, 2 Drawing Sheets

RANGE INFINITE SWITCH WITH INTEGRAL GFCI SUBSYSTEM

FIELD OF THE INVENTION

The present subject matter relates to home appliances. More particularly, the present subject matter relates to improvements in temperature control switches for cooktops, particularly those cooktops employing coil type heating elements.

BACKGROUND OF THE INVENTION

Electric range cooktops employing steel tube and magnesium oxide heaters have a propensity to degrade and short. Depending upon where a short may develop within the coil assembly, a shorting event can lead to excessive energy and molten metal being expelled. Incorporation of a ground fault circuit interrupter (GFCI) device within the cooktop can provide early detection of a short by monitoring for the presence of leakage currents thereby permitting disablement of the load, that is, the heating element, before a high power event occurs.

Advantages obtained through the inclusion of a GFCI device include reducing the risk of element shorting events as well as other undesirable occurrences including potential electric shock of a user or a fire within the cooktop. Often, the cooktop connector system, harnessing, and controls are damaged during occurrence of a high power event. Prior attempts to address these disadvantages have called for employing GFCI circuits utilizing relays in the cooktops which are separate from the traditional infinite control switches. This approach also has disadvantages due to the fact that simultaneous opening of both the power lines in a split-phase mains fed appliance is not assured.

Thus, a need exists for a protective approach that will ensure that both power lines to the heaters will open simultaneously. It would be particularly advantageous to simultaneously disconnect both power lines especially if the GFCI circuit becomes disconnected from only one power line becoming open thus loosing further protection.

BRIEF DESCRIPTION OF THE INVENTION

Aspects and advantages of the invention will be set forth in part in the following description, or may be obvious from the description, or may be learned through practice of the invention.

The present subject matter relates to a range infinite switch having a housing in which is mounted a shaft having a longitudinal axis which shaft is mounted at least partially within the housing for rotational and axial movement. A cam is secured to the shaft for rotational and axial movement therewith and a pair of terminals are provided and configured to be coupled to a source of alternating current (AC). The switch includes at least one pair of contacts positioned for movement between open and closed positions based on movements of the cam. There is also provided a ground fault circuit interrupter (GFCI) circuit board mounted within the housing and configured to monitor current flow through the pair of terminals. A solenoid operable in response to the GFCI is provided along with a plunger operable in response operation of the solenoid. A latching mechanism within the housing is configured to hold the cam in a first axial position until released by operation of said plunger so that release of the cam causes the at least one pair of contacts to separate. In this manner, any load coupled to the separated contacts will be disconnected from power applied to the pair of terminals upon detection of a ground fault.

The present subject matter also relates to a range infinite switch having a housing having a pair of side walls and a pair of end walls. In accordance with an exemplary embodiment, such range infinite switch incorporates a shaft extending through the pair of end walls and mounted within the housing for rotational and axial movement as well as a cam mounted within the housing and secured to the shaft for rotational and axial movement therewith. The range infinite switch also includes at least one pair of contacts positioned within the housing for activation by the cam. In accordance with this embodiment of the present subject matter, a fork is pivotally mounted at one end within a side wall of the housing and extends into the housing and is in contact with the cam for positioning the cam in a first position. A fork retainer is provided and configured to retain the fork in the first position. The range infinite switch further includes a ground fault circuit interrupter (GFCI) board mounted within the housing. The GFCI board including a solenoid energizeable upon detection of a ground fault and a plunger operable upon energization of the solenoid to move the fork retainer to release the fork. Release of the fork permits axial movement of the cam and opening of the at least one pair of contacts.

Embodiments of the preset subject matter further relates to a cooktop appliance. According to such embodiments there is provided a cooktop including at least one heating element and at least one range infinite switch configured to control application of electrical energy to the at least one heating element. In such embodiments the at least one range infinite switch comprises a housing, a shaft having a longitudinal axis mounted at least partially within the housing for rotational and axial movement, and a cam secured to the shaft for rotational and axial movement therewith. Further the at least one range infinite switch includes a pair of terminals configured to be coupled to a source of alternating current (AC) and at least one pair of contacts positioned for movement between open and closed positions based on movements of the cam. In such embodiments, there is also provided a ground fault circuit interrupter (GFCI) board mounted within the housing and configured to monitor current flow through the pair of terminals. The at least one range infinite switch also includes a solenoid operable in response to the GFCI, a plunger operable in response operation of the solenoid and a latching mechanism configured to hold the cam in a first axial position until released by operation of the plunger. In such embodiments release of the cam causes the at least one pair of contacts to separate thereby disconnecting power to the at least one heating element upon detection of a ground fault condition by the GFCI board.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
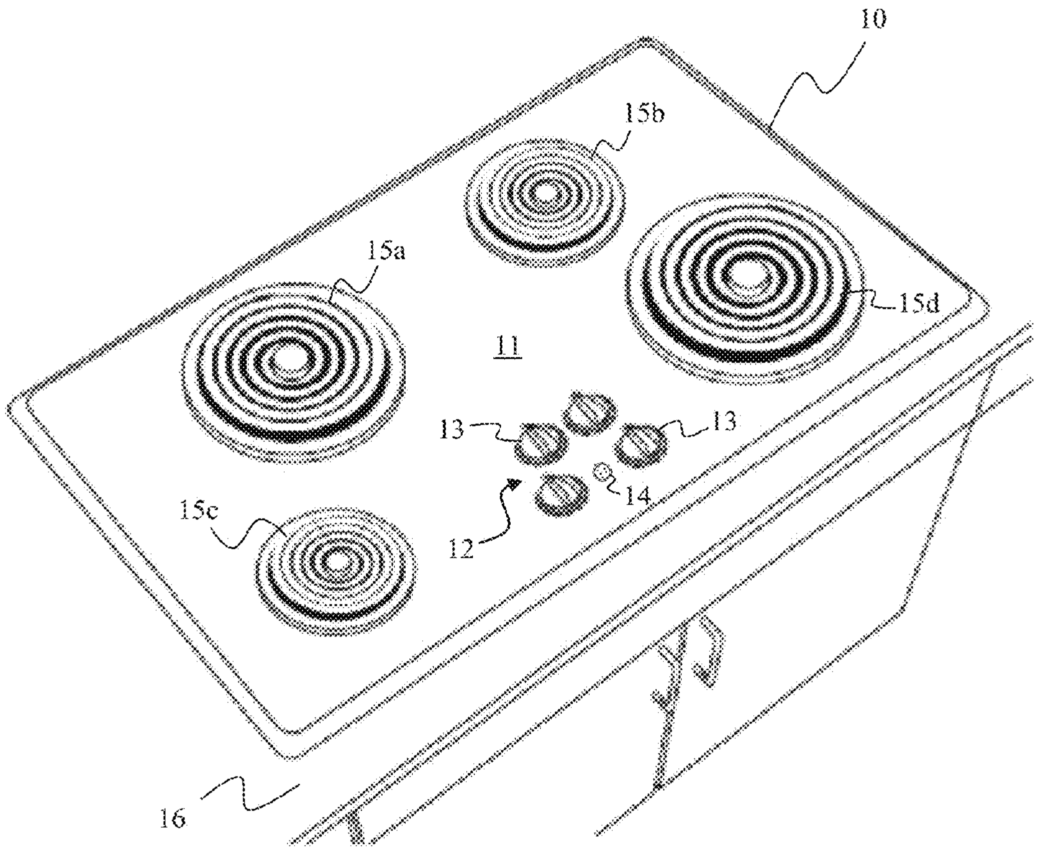
FIG. 1 is a perspective view of a cooktop embodying coil-top cooktop useful in describing one form of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to home appliances and, more particularly, to improvements in temperature control switches for cooktops, particularly those cooktops employing coil type heating elements.

It should be appreciated that while the present disclosure is particularly directed to improvements in switches designed in general for use with cooktops, it is also envisioned that such switch may equally be employed with other appliances or devices where protection from ground fault currents in an electrical load is desirable.

Referring more particularly to the presently disclosed subject matter and with reference to FIG. 1 there is shown a cooktop unit 10 comprising a conventional planar glass-ceramic cooktop surface 11 and a control panel 12, the latter incorporating cooking temperature controls 13, and indicator lights 14 to indicate the "on" condition of the cooking heaters. A plurality of steel sheathed coil assemblies 15*a*-15*d* adapted to orient and support cooking utensils during normal cooking operations are provided The cooktop unit 10 is shown in the form of a built-in unit mounted in the counter top 16 of a kitchen cabinet, however, it will be understood that a cook unit incorporating the present subject matter may be embodied in other arrangements such as the cooking surface atop the oven of a free standing range.

Figure 2:
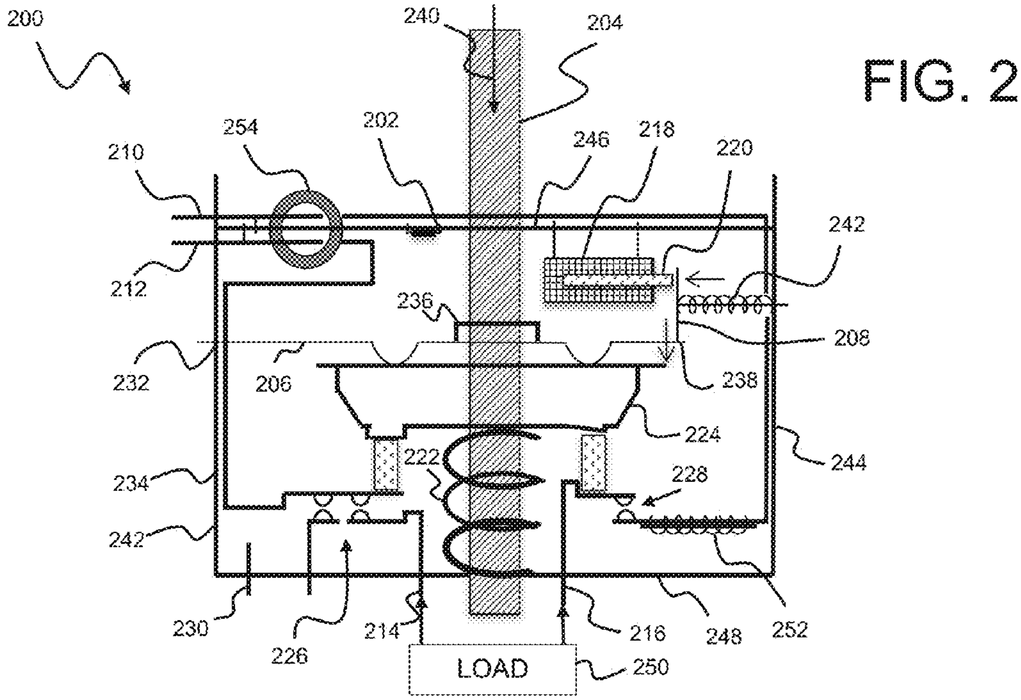
FIG. 2 illustrates a schematic representation of a range infinite switch with integral GFCI subsystem in accordance with the present subject matter in an operating position.
Figure 3:
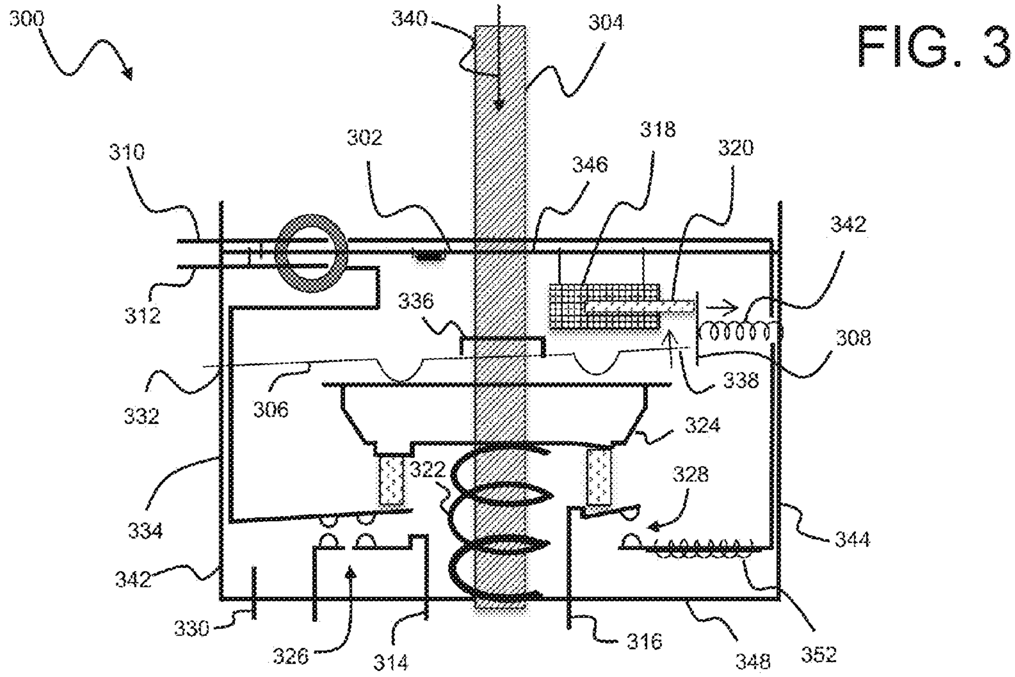
FIG. 3 illustrates a schematic representation of a range infinite switch with integral GFCI subsystem in accordance with the present subject matter in a tripped position.

With reference to FIGS. 2 and 3 there are illustrated representations of a range infinite switch 200, 300 with integral GFCI subsystem 202, 302 in accordance with the present subject matter. FIG. 2 illustrates switch 200 in a normal position, that is, a position where electrical power is applied to a load. FIG. 3 illustrates switch 300 in a tripped position, that is, in a position where electrical power is not applied to a load.

Switch 200, 300, in accordance with the present subject matter, corresponds to an assembly which is a combination of a generally traditional "Infinite" switch used for electric range cooktop element level setting combined with a Ground Fault Circuit Interrupter (GFCI) detector and high current circuit deactivator. Examples of such traditional "Infinite" switches are well known in the art as exemplified by U.S. Pat. No. 4,052,591 to Sekera, Jr. et al. It is noted that the switch illustrated by Sekera, Jr. et al. corresponds to a voltage-mode type infinite switch as it includes a heater coil for the bi-metal element couple in parallel with the heating element to be controlled. Those of ordinary skill in the art will appreciate, however, that the present subject matter may also be employed in current-mode infinite switches wherein current flowing through the bi-metal is used as the bi-metal heat source. Likewise, GFCI circuits are also well known in the art as exemplified by U.S. Pat. No. 4,001,646 to Howell and assigned to the assignee of the present subject matter. The present subject matter, however, combines these known devices in a synergistic way along with a high current circuit deactivator mechanism to afford improved electrical fault protection for cooktops.

With further reference to FIG. 2, in "normal" operation of the cooktop, switch 200 functions as a traditional current-mode infinite switch where the arc, i.e., rotational, position of D-shaft 204 selects between OFF, FULL ON and infinitely variable duty cycle selection in between. If a ground fault is detected in load 250, switch 200 cuts off the load current via operation of a mechanical interlocking arrangement between fork 206 and fork retainer 208 together with the axial movement of D-shaft 204, fork 206, and cam 224 in a direction opposite to arrow 240 causing separation of contact sets 226, 228 as will be described further later. Once tripped, manual intervention is required to restore normal operation. Generally a reset operation may be performed by pushing D-shaft 204 axially in the direction of arrow 240 so as to allow fork 206 to once again be latched in place by fork retainer 208 while at the same time moving cam 224 in the direction of arrow 240 so as to permit closure of contact sets 226, 228 when called for depending on the arc (rotational) position cam 224.

With more specific reference to FIG. 2, it will be seen that switch 200 generally corresponds to a rectangular housing 234 having generally vertical parallel sidewall portions 242, 244 and horizontal end wall portions 246, 248. FIG. 2 illustrates switch 200 in an operating position, that is, in a position where electrical power is applied to load 250, that, in this particular case, may correspond to a heating element for a cooktop. Further, switch 200 includes a D-shaft 204 that at least partially extends through end wall portions 246, 248. D-shaft 204 is coupled to cam 224 in a manner such that both D-shaft 204 and cam 224 may rotate around the axial direction of D-shaft 204 represented by arrow 240 and to move axially together along the axis illustrated by arrow 240.

Switch 200 further includes a GFCI circuit board 202 that, in certain embodiments, may correspond in part to end wall portion 246 of housing 234. Alternative embodiments may provide a further wall portion configured to enclose GFCI circuit board 202 along with the remaining switch 200 components. In an exemplary configuration, GFCI circuit board 202 may correspond to a printed circuit board supporting various components including a current transformer 254 and solenoid 218 all of which are well known in the art and are exemplified by the '646 patent to Howell previously noted. In accordance with the present subject matter, a high current circuit deactivator mechanism is provided by way of the cooperative operation of fork 206, fork retainer 208, cam 224 and contact sets 226, 228, all activated by the operation of a solenoid 218 and plunger 220 associated with GFCI board 202.

With continued reference to FIG. 2, there is illustrated a fork 208 that is pivotally mounted in housing 234 such that one end of fork 206 passes through an opening in side wall portion 242 to provide a fulcrum point 232 for fork 206. A central length of fork 206 is configured to contact cam 224 and fork end 238 remote from fulcrum point 232 is engaged with fork retainer 208 to hold for 206 in contact with cam 224 against an a tension force produced by spring 222. The central portion of fork 206 may be engaged by a securing device 236 to secure fork 206 to D-shaft 204 to maintain fork 206 in proper position and orientation for proper interaction at fulcrum point 232 and cooperative operation with fork retainer 208. In this configuration, cam 224 may be rotated by way of rotational interaction with D-shaft 204 to operate as a traditional current-mode "Infinite" switch for electric range cooktop element control in cooperation with contact sets 226, 228 in a well-known manner. Generally, however, infinite switch operates based on rotation of cam 224 that causes contact set 226 to open and close based on "ON" and "OFF" positions of the switch. At the same time contact set 228 is variably biased so that heating of bimetal and heater arm 252 of the contact set must traverse variable distances in order to energize or deenergize load 250, for example, a heating element.

In normal operation, household alternating current (AC) is applied to terminals 210, 212, so that current flow through terminals 210, 212 is equal. If a path to ground develops in load 250 connected to terminals 214, 216, the current flow through terminals 210, 212 becomes unequal. i.e., unbalanced. This unbalanced current flow is sensed by GFCI 202 in a well-known manner. When a current unbalance is sensed by GFCI 202 circuit, the circuit activates solenoid 218 whose plunger 220 displaces fork retainer 208 against a retaining force produced by spring 242. Displacement of fork retainer 208 allows end portion 238 of fork 206 to become free and to move upwardly in a direction opposite to arrow 240 along with cam 224 due to the force produced by spring 222. Movement of cam 224 in a direction opposite to arrow 240 causes contact sets 226, 228 to open thereby disconnecting any load connected to terminals 214, 216 from a power source connected to terminals 210, 212.

With reference to FIG. 3, it will be seen that freed fork 306 relieves spring 322 pressure on cam 324. When cam 324 is relieved, the contact sets 326, 328 it actuates are unloaded resulting in a spread between the contacts. When cam 324 and contact sets 326, 328 are no longer under spring 322 tension, contact sets 326, 328 cannot close to complete a circuit to the load. If the fault is removed or repaired, the mechanism can be reset to normal operating position by pressing on D-shaft 304 in an axial direction, i.e., in the direction of arrow 340. D-shaft 304 is typically accessible from the front panel of the range as, for example, shown at 13 (FIG. 1).

In accordance with the present subject matter, the synergistic placement of contacts 226, 228, 326, 328, cam 224, 324, fork 206, 306, fork retainer 208, 308, springs 222, 322, solenoid 218, 318, plunger 220, 320, and D-shaft 204, 304 allows proper mechanical sequence for tripping and resetting.

As is common in GFCI circuits, a TEST terminal 230, 330 may be coupled to GFCI circuit 202, 302 to provide a means to simulate an unbalanced current. When test terminal 230, 330 is connected, switch 200, 300 will trip, i.e., disconnect the heating element after which switch 200, 300 can be manually reset as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A range infinite switch, comprising:
- a housing;
- a shaft having a longitudinal axis mounted at least partially within said housing for rotational and axial movement;
- a cam secured to said shaft for rotational and axial movement therewith;
- a pair of terminals configured to be coupled to a source of alternating current (AC);
- at least one pair of contacts positioned for movement between open and closed positions based on movements of said cam;
- a ground fault circuit interrupter (GFCI) board mounted within said housing, said GFCI board configured to monitor current flow through said pair of terminals;
- a solenoid operable in response to said GFCI;
- a plunger operable in response operation of said solenoid; and
- a latching mechanism configured to hold said cam in a first axial position until released by operation of said plunger,
- whereby release of said cam causes said at least one pair of contacts to separate.

2. The switch of claim 1, wherein said latching mechanism comprises a fork pivotally mounted at one end to said housing, extending across said cam to maintain said cam in said first axial position and secured at an opposite end thereof by a fork retained, and wherein said fork retainer is positioned for movement by operation of said plunger.

3. The switch of claim 2, further comprising:
- a spring mounted in said housing and positioned to apply force to said cam whereby said cam may be moved axially to a second axial position upon release of said latching mechanism.

4. The switch of claim 3, further comprising:
- a second spring mounted in said housing and positioned to apply force to said fork retainer and plunger, whereby external pressure applied to said shaft may be used to reset cam to said first axial position.

5. The switch of claim 3, further comprising:
- a terminal coupled to one contact of said at least one pair of contacts and configured to be coupled to a load,
- wherein one terminal of said pair of terminals configured to be coupled to a source of alternating current (AC) is coupled to the other of said at least one pair of contacts,
- whereby movement of said cam to said second axial position causes separation of said at least one pair of contacts thereby disabling AC power from being applied to a load.

6. The switch of claim 5, further comprising:
- a second pair of contacts positioned within said housing for activation by said cam; and
- a second terminal coupled to said second set of contacts and configured to be coupled to a load,
- wherein another terminal of said pair of terminals configured to be coupled to a source of alternating current (AC) is coupled to the other of said second pair of contacts,
- whereby movement of said cam to said second axial position causes separation of said second pair of contacts,
- whereby a load connected to the other of the contacts of said at least one pair of contacts and said second set of contacts may be disconnected from both said pair of terminals upon detection of a ground fault.

7. A range infinite switch, comprising:
- a housing having a pair of side walls and a pair of end walls;
- a shaft extending through said pair of end walls and mounted within said housing for rotational and axial movement;

a cam mounted within said housing and secured to said shaft for rotational and axial movement therewith;

at least one pair of contacts positioned within said housing for activation by said cam;

a fork pivotally mounted at one end within a side wall of said housing and extending into said housing and in contact with said cam for positioning said cam in a first position;

a fork retainer configured to retain said fork in said first position;

a ground fault circuit interrupter (GFCI) board mounted within said housing, said GFCI including a solenoid energizeable upon detection of a ground fault; and a plunger operable upon energization of said solenoid to move said fork retainer to release said fork, whereby release of said fork permits axial movement of said cam and opening of said at least one pair of contacts.

8. The switch of claim 7, further comprising:

a first spring positioned to bias said fork retainer in a direction to retain said fork in said first position.

9. The switch of claim 8, further comprising, a second spring positioned to bias said cam in a direction to open said at least one contact set upon release of said fork.

10. The switch of claim 5, further comprising:

a pair of terminals configured to be coupled to a source of alternating current (AC); and a second set of contacts positioned within said housing for activation by said cam, wherein one contact of said at least one pair of contacts is coupled to one of said pair of terminals, and wherein a one contact of said second set of contacts is coupled to another of said pair of terminals, whereby a load connected to the other of the contacts of said at least one pair of contacts and said second set of contacts may be disconnected from both said pair of terminals upon detection of a ground fault.

11. A cooktop appliance, comprising:

a cooktop including at least one heating element; and at least one range infinite switch configured to control application of electrical energy to said at least one heating element, wherein said at least one range infinite switch comprises:

a housing;

a shaft having a longitudinal axis mounted at least partially within said housing for rotational and axial movement;

a cam secured to said shaft for rotational and axial movement therewith;

a pair of terminals configured to be coupled to a source of alternating current (AC);

at least one pair of contacts positioned for movement between open and closed positions based on movements of said cam;

a ground fault circuit interrupter (GFCI) board mounted within said housing, said GFCI board configured to monitor current flow through said pair of terminals;

a solenoid operable in response to said GFCI;

a plunger operable in response operation of said solenoid; and a latching mechanism configured to hold said cam in a first axial position until released by operation of said plunger, whereby release of said cam causes said at least one pair of contacts to separate thereby disconnecting said at least one heating element from said source of alternating current.

12. The cooktop appliance of claim 11, wherein said latching mechanism comprises a fork pivotally mounted at one end to said housing, extending across said cam to maintain said cam in said first axial position and secured at an opposite end thereof by a fork retained, and wherein said fork retainer is positioned for movement by operation of said plunger.

13. The cooktop appliance of claim 12, wherein said at least one range infinite switch further comprises:

a spring mounted in said housing and positioned to apply force to said cam whereby said cam may be moved axially to a second axial position upon release of said latching mechanism.

14. The cooktop appliance of claim 13, wherein said at least one range infinite switch further comprises:

a second spring mounted in said housing and positioned to apply force to said fork retainer and plunger, whereby external pressure applied to said shaft may be used to reset cam to said first axial position.

15. The cooktop appliance of claim 13, wherein said at least one range infinite switch further comprises:

a terminal coupled to one contact of said at least one pair of contacts and configured to be coupled to a load, wherein one terminal of said pair of terminals configured to be coupled to a source of alternating current (AC) is coupled to the other of said at least one pair of contacts, whereby movement of said cam to said second axial position causes separation of said at least one pair of contacts thereby disabling AC power from being applied to a load.

16. The cooktop of claim 15, wherein said at least one range infinite switch further comprises:

a second pair of contacts positioned within said housing for activation by said cam; and a second terminal coupled to said second set of contacts and configured to be coupled to a load, wherein another terminal of said pair of terminals configured to be coupled to a source of alternating current (AC) is coupled to the other of said second pair of contacts, whereby movement of said cam to said second axial position causes separation of said second pair of contacts, whereby a load connected to the other of the contacts of said at least one pair of contacts and said second set of contacts may be disconnected from both said pair of terminals upon detection of a ground fault.

17. The cooktop appliance of claim 11, comprising:

at least one second heating element; and at least one second range infinite switch constructed identically to said at least one range infinite switch and configured to control application of electrical energy to said at least one second heating element, whereby said at least one heating element and said at least one second heating element may be separately disconnected from said source of alternating current.

* * * * *